Figure 1:
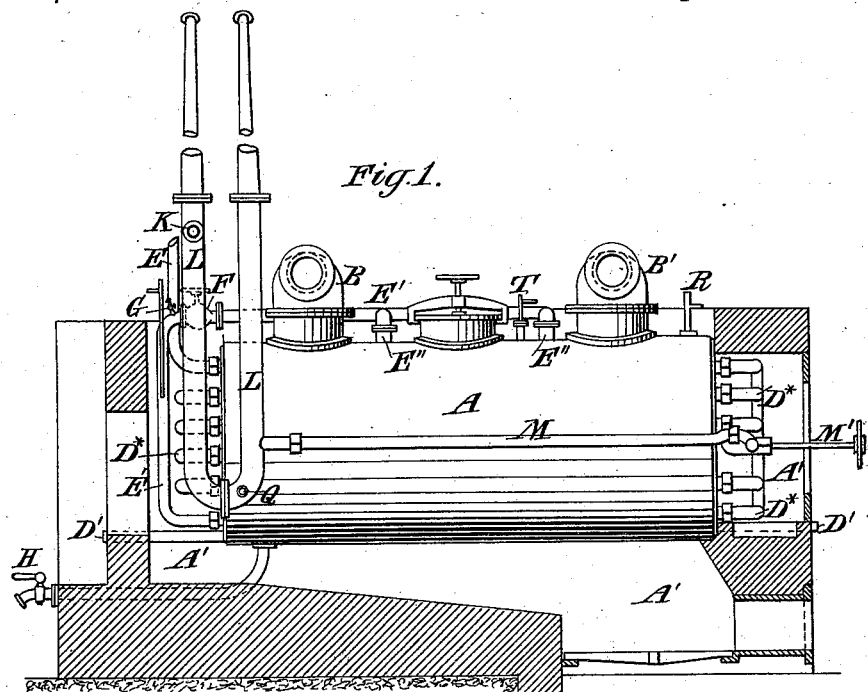

(No Model.) 2 Sheets—Sheet 1.
P. MARIX.
APPARATUS FOR DISTILLING FAT ACIDS.
No. 400,469. Patented Apr. 2, 1889.

Witnesses:
C. L. Sundgren
Joseph W. Roe

Inventor:
Paul Marix
by attorneys
Brown & Hall (No Model.) 2 Sheets—Sheet 2.
P. MARIX.
APPARATUS FOR DISTILLING FAT ACIDS.
No. 400,469. Patented Apr. 2, 1889.
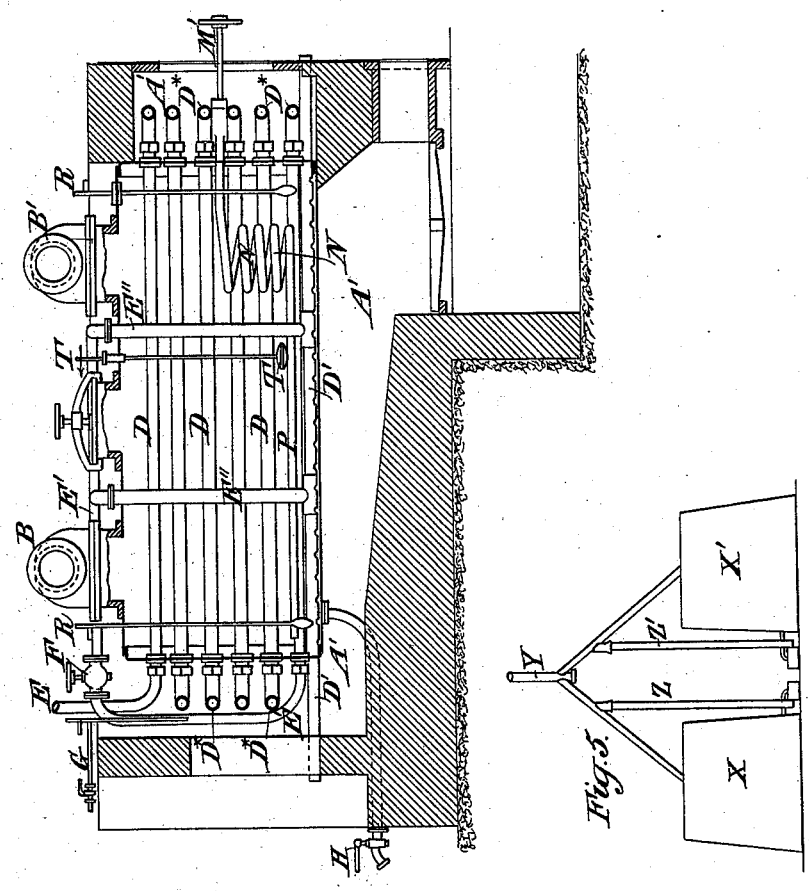
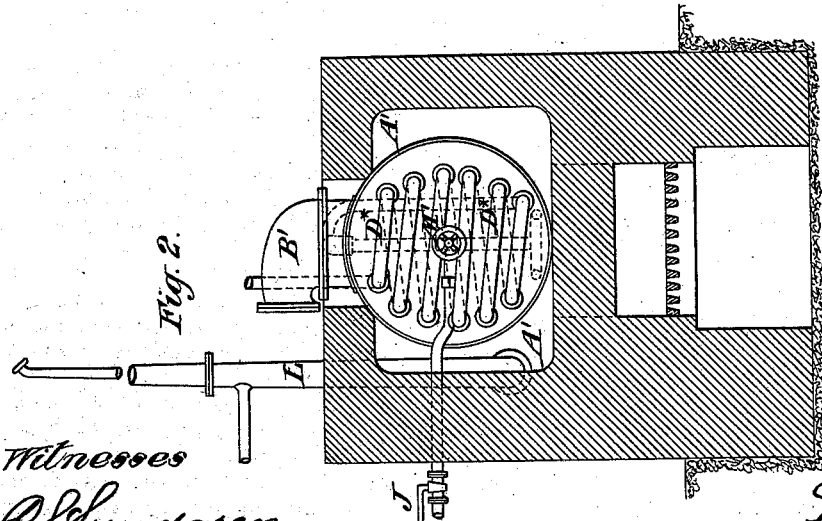
Witnesses
C. Sundgren
Joseph W. Roe.
Inventor:
Paul Marix
By attorneys
Brown & Hall

UNITED STATES PATENT OFFICE.

PAUL MARIX, OF PARIS, FRANCE, ASSIGNOR TO THE SOCIÉTÉ INDUSTRIELLE DES GLYCERINE ET ACIDES GRAS, OF SAME PLACE.

APPARATUS FOR DISTILLING FAT ACIDS.

SPECIFICATION forming part of Letters Patent No. 400,469, dated April 2, 1889.

Application filed June 27, 1888. Serial No. 278,317. (No model.) Patented in France October 11, 1886, No. 178,973; in Belgium October 14, 1886, No. 74,836; in Luxemburg August 16, 1887, No. 874, and in Spain March 7, 1888, No. 12,092.

*To all whom it may concern:*

Be it known that I, PAUL MARIX, a citizen of the Republic of France, residing at Paris, in said Republic, have invented a new and useful Improvement in Apparatus for Distilling Fat Acids, (for which I have obtained Letters Patent in France by brevet d'invention, dated October 11, 1886, No. 178,973; Belgium by brevet de perfectionment, dated October 14, 1886, No. 74,836; Luxemburg by brevet d'invention, dated August 16, 1887, No. 874; Spain by brevet d'invention, dated March 7, 1888, No. 12,092,) of which the following is a specification, reference being had to the accompanying drawings.

To obtain a good distillation of fat acids it is indispensable that the whole mass under distillation should be always at uniform temperature, and that this temperature may be easily regulated in such manner as to be maintained constant. The uniformity of temperature permits of the regulating of the distillation to be obtained. The facility of regulating the temperature renders possible the maintenance of a constant degree lower than that which could effect the decomposition of the neutral particles which fat acids contain, owing to an almost always incomplete siphonification. These conditions of good distillation are very difficult to obtain by the processes and apparatus heretofore in use, by which the distillation is effected on masses relatively considerable. On the other hand, these processes compel a stoppage of the apparatus, for during the distillation it is impossible to introduce new matter, which would suddenly lower the temperature to the point of introduction and lead to hurtful disturbances in the distillation.

My apparatus has for its object to realize in a mathematical fashion, which it is practically possible to obtain, the condition of uniformity of heat in the mass under distillation and of regulation of the temperature of the matters under treatment to keep them always at a degree constant and determined.

The action of my apparatus depends, for one part, on a special circulation of steam through a tube running in serpentine form through the mass under treatment and having external elbows within the flues of the furnace by which the mass is heated, such arrangement of tube permitting the regulation of the temperature of such steam to a degree slightly greater than that of the matters under treatment at the moment where it is disengaged to accelerate the distillation by agitation, and consequent production of a mechanical throwing off. The action depends, for another part, on the continuous feeding of the matters to be distilled. These matters before entering the apparatus circulate in the tube, running back and forth within flues to be preparatorily heated, and, passing afterward through a coil submerged in the mass which is being distilled in the apparatus, are put in an equilibrium of temperature with those which have already been contained therein before being mixed with these latter. In these conditions the matters being fed into the apparatus arrive at a suitable temperature to be ready for distillation, and the furnace which heats the distilling apparatus has only for its function that of furnishing the apparatus with the heat necessary for transforming into steam the matters already arrived at the temperature of vaporization.

This apparatus, which I have represented in the accompanying drawings, is composed, essentially, of a boiler of suitable form and dimensions traversed by a certain number of tubes secured in the two extremities of the boiler and intended to receive steam, which is superheated in its passage through the bends of the said tubes exposed to the hot gas of the furnace outside of the boiler. The boiler is furnished with domes communicating with condensers, and also furnished with means of keeping up a continuous feeding of the matters to be distilled.

I am aware that it has heretofore been attempted to produce the circulation of steam through a coil arranged in the middle of liquid matter to be evaporated in such manner as to communicate to the steam a temperature equal to that of the said matter before allowing the steam to escape into the said matter; but the new arrangement of the tubes in my apparatus presents over the systems of coils heretofore employed the great advantage of giving a regulated supply of superheated steam at a temperature higher than that of the liquid matter, so that the said steam intended to serve for the carrying off of the matters is kept infallibly at a temperature higher than the liquid itself at the moment when it is required to carry them off—a condition indispensable to good distillation. This augmentation of temperature is regulated at will by the construction of the furnace and its management by the aid of thermometers or pyrometers. Thus an important feature of my apparatus consists in its providing for obtaining automatically, at will, superheated steam at a temperature of 2°, 5°, 10°, and 20°, and more, if necessary, above that of the liquid under distillation, and for always performing this distillation by steam kept infallibly at a definite degree of temperature higher than that of the matter itself.

Figure 3:
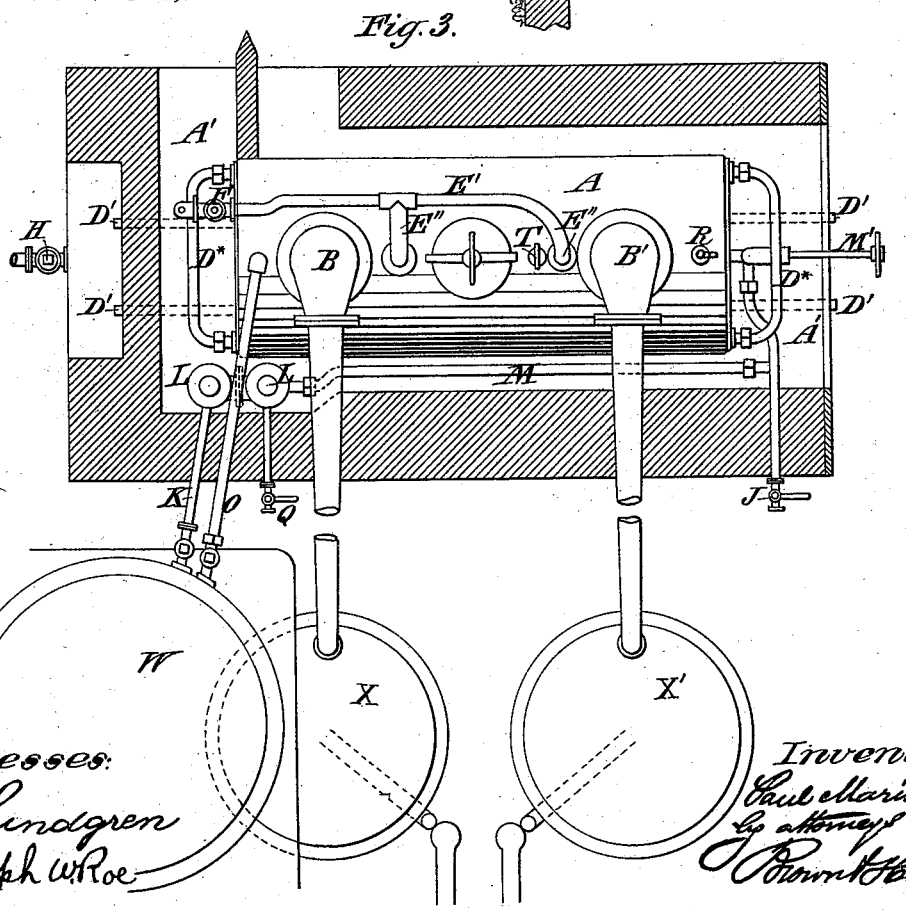

In the accompanying drawings, Figure 1 is a side elevation of my apparatus, the side wall of the furnace being omitted to show the interior. Fig. 2 is an end view of the same with the furnace-front omitted. Fig. 3 is a plan view having the crown of the furnace-casing omitted. Fig. 4 is a central longitudinal section of the same, and Fig. 5 is an elevation of the condensing apparatus.

Similar letters of reference designate corresponding parts in all the figures.

The boiler A is represented as of horizontal cylindrical form, closed at its ends by tube-sheets and surmounted by two domes, B B', communicating each with one of two condensers, X X', by means of copper tubes, and terminating within the condensers in serpentine coils of lead pipe. The two tubes may, however, be connected with a single coil in a single condenser. The tube-sheets, which form the ends of the boiler A, receive a certain number of tubes, D, connected with each other by means of bends D* outside the tube-sheets and within the furnace A', wherein the said bends are exposed to the flame and heated gases, as represented in Figs. 1, 2, and 4. The said tubes D and bends D* form a continuous coil.

The steam arrives in the apparatus through a tube, E, and passes through all the tubes D, and it is superheated by passing through the bends D* of the said tubes, which are arranged for this purpose in the flues of the furnace, and passes out by the tube E', arranged above the boiler and embedded in the setting thereof to prevent cooling. This tube E', which is furnished with a regulating-cock, F, is divided into two or more branches, E'', and communicating with the distributer D', arranged in the lower part of the boiler A, and composed of two or more parallel tubes having small perforations in the lower part. The distributer-tubes D' are prolonged beyond the front of the boiler-setting and furnished with movable bonnets, in order to provide for easily cleaning them. The exit-tube E' is also furnished, a little below the cock F, with a very small tube furnished with a test-cock, G. A thermometer at this place permits it to be ascertained whether the steam is sufficiently superheated, in order that it may be delivered in the condition required into the distributer-tubes D'. This is effected by opening the cock F, which regulates at the same time the introduction of the steam, as may be necessary.

Having recognized that it is preferable to not charge the apparatus all at once with the matter to be distilled, I have adopted an arrangement permitting me to feed the still without any inconvenience during the operation of distillation. For this purpose the matter to be fed is contained in a tank, W, placed at about two meters above the boiler of the apparatus. This reservoir W is in communication by a tube with the steam-boiler in such manner that the steam in passing through a coil within said reservoir keeps the matter therein at a high temperature. The matter descends from the tank W by a tube O, to be introduced into the apparatus, and also by a tube K, and for continuous feeding it passes first through a U-shaped tube L, thence through a horizontal tube, M, both placed in the furnace, and afterward through a coil, N, arranged inside of the boiler A, and thence to pass into the mass by a perforated tube, P, running the whole length of the boiler. During its passage through the tube L, which is prolonged to about two meters above the level of the liquid in such manner as to form two chimneys, the matter is completely dried. This arrangement lessens the evil effect of the introduction of matters which may contain humidity. A discharge-cock, Q, placed in the lower part of the tube L, permits it to be cleaned out. Thus dried matters pass through the tube M, which extends the whole length of the boiler within the furnace, and continue to be heated. A regulating-cock, M', placed in the tube M at a point where it enters the boiler, serves to regulate the feed. Thus introduced into the apparatus and already heated in the furnace, the matter circulates through a coil, N, which being submerged in the matter in the boiler takes completely the temperature of said matter. It then passes into the matter in the boiler by the tube P, which extends nearly the whole length of the apparatus, and is perforated with holes. It is easy to understand that the feeding performed under these conditions cannot in any way derange the progress of distillation. A float, T, having its rod passing through a stuffing-box, and having a scale applied to it, indicates always on the exterior the level of the liquid contained in the apparatus, and by its indication it is easy to regulate the introduction of the matter.

The arrangement of the furnace in which the apparatus is placed is very important to the regular operation of the apparatus and to the superheating of the steam and to the heating of the matter during the feeding. Although in the arrangement shown in the drawings the furnace is placed under the boiler, the furnace may be placed in front of it. In order to facilitate the regulation of the temperature of the matter in the boiler, a thermometer, R, is placed at each end thereof. The apparatus is completed by a man-hole for the purpose of cleaning it out, by a test-cock, J, to ascertain the nature of the matter before its entrance into the boiler A, and by discharge-cock H, for the discharge of the residues after the operation is terminated. The distilled products are received into condensers X X' of any kind furnished with a ventilating-chimney, Y, and with tubes Z Z', for returning to the condenser the products which have entered the chimney Y and which have been condensed therein.

It is to be remarked that in consequence of this feeding at the temperature of the matters under treatment in the apparatus no trouble is produced, and that the distillation is regulated throughout the apparatus owing to the uniformity of temperature. This uniformity of temperature is, moreover, so much more easy to regulate in my apparatus that, owing to the continuous feeding for a given production in a given time, I can operate upon relatively small quantities of matter, whence results the diminution of the dimensions of the apparatus and consequent economy of plant and room. Finally, the regulation of the temperature being more easy, I am enabled to maintain constantly the exact degree of temperature which will not permit the decomposition of neutral bodies.

The process hereinabove described and performed in my apparatus constitutes no part of the invention herein described, but is in part the subject of my application for United States Letters Patent, Serial No. 250,560, filed September 24, 1887, and in part the subject of my application, Serial No. 278,318, filed June 27, 1888.

What I claim as my invention, and desire to secure by Letters Patent, is—

The combination, in an apparatus for distilling fat acids, of a horizontal cylindrical boiler, A, and a furnace within the flues of which both ends of the said boiler are exposed, a train of steam-pipe for receiving steam from a source outside of said boiler and delivering the said steam thereinto, said steam-pipe comprising a coil of which straight portions D run lengthwise of the said boiler from end to end thereof, and of which bends D*, for superheating the steam passing through said coil, are arranged within the flues outside the ends of the said boiler, a pipe, E', from the outlet of said coil, and a perforated steam-distributing tube, D', connected with said coil and arranged within and near the bottom of the boiler, substantially as and for the purpose herein described.

In testimony whereof I have signed this specification in the presence of two subscribing witnesses.

PAUL MARIX.

Witnesses:
ROBT. M. HOOPER,
PAUL CEIRALF.